(12) United States Patent
Shimada et al.

(10) Patent No.: US 7,698,418 B2
(45) Date of Patent: Apr. 13, 2010

(54) MONITORING SYSTEM

(75) Inventors: Hirokazu Shimada, Yokohama (JP);
Yasuhiro Yamauchi, Yokohama (JP);
Yoshinori Hiraike, Yokohama (JP);
Katsuaki Yamanaka, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1196 days.

(21) Appl. No.: 11/191,991

(22) Filed: Jul. 29, 2005

(65) Prior Publication Data
US 2006/0224726 A1 Oct. 5, 2006

(30) Foreign Application Priority Data
Mar. 29, 2005 (JP) ............... 2005-094928

(51) Int. Cl.
*G06F 15/173* (2006.01)
(52) U.S. Cl. ..................................... 709/224
(58) Field of Classification Search .................. 709/224
See application file for complete search history.

(56) References Cited

U.S. PATENT DOCUMENTS

| | | | | |
|---|---|---|---|---|
| 6,438,592 | B1* | 8/2002 | Killian ........................ | 709/224 |
| 2002/0120727 | A1* | 8/2002 | Curley et al. ................. | 709/223 |
| 2002/0184363 | A1* | 12/2002 | Viavant et al. ............... | 709/224 |
| 2003/0214678 | A1* | 11/2003 | Shibata et al. .............. | 358/405 |
| 2004/0153563 | A1* | 8/2004 | Shay et al. ................... | 709/232 |
| 2006/0085541 | A1* | 4/2006 | Cuomo et al. ................ | 709/224 |

FOREIGN PATENT DOCUMENTS

| | | |
|---|---|---|
| JP | 04-086049 | 3/1992 |
| JP | 2000-116034 | 4/2000 |

* cited by examiner

*Primary Examiner*—Moustafa M Meky
*Assistant Examiner*—Avi Gold
(74) *Attorney, Agent, or Firm*—Fujitsu Patent Center (57) ABSTRACT

A monitoring system of the present invention achieves highly reliable switching control by having a monitored response time creating/calculating unit calculate a maximum value and a minimum value between which a response time is judged as normal from a response time of the last measurement and from a response time of the last but one measurement, and by having a monitored response time comparing unit set a range in which a response time is judged as normal in a manner that agrees with past response times.

6 Claims, 6 Drawing Sheets

MONITORING SYSTEM

BACKGROUND OF THE INVENTION

1. Field of the Invention

The present invention relates to a monitoring system, recording medium storing a monitoring program and a monitoring method which are for monitoring whether or not switching of lines, switching of devices, control of a plant, control of an information system, etc. are completed normally.

2. Description of Related Art

An object of communication devices, information processing devices, and other similar devices is to raise the communication quality. For this object, prior art has an auxiliary line separate from a main line, which is provided to a subscriber. When there is a failure in the main line in prior art, the main line is switched to the auxiliary line. Prior art attains the object by thus switching the lines.

A line controlling device switches the main line and the auxiliary line. The controlling device decides to make a switch depending on the state of communications over the main line and the auxiliary line each, such as the presence or absence of a line failure and the line state. For this purpose, the controlling device monitors the communication state. The controlling device chooses which one of the lines is to be the operating line based on the monitored communication state. A control signal is therefore sent from the controlling device to a commanded-to-switch-lines device.

In the line switching control, the controlling device sends a line switching command to the commanded-to-switch-lines device. The commanded-to-switch-lines device follows the received command and line switching control is executed in the device. After the line switching is completed normally, the commanded-to-switch-lines device sends a notification of completion of the line switching to the controlling device.

The controlling device monitors a response time, which starts at the moment a line switching command is sent and ends at the moment a line switching completion notification is received from the commanded-to-switch-lines device. The controlling device judges whether the response is received within an estimated normal time or not. Based on the judgment, the controlling device detects a communication trouble between the controlling device and the commanded-to-switch-lines device, and detects an anomaly, a failure, or the like in the commanded-to-switch-lines device.

Figure 5:
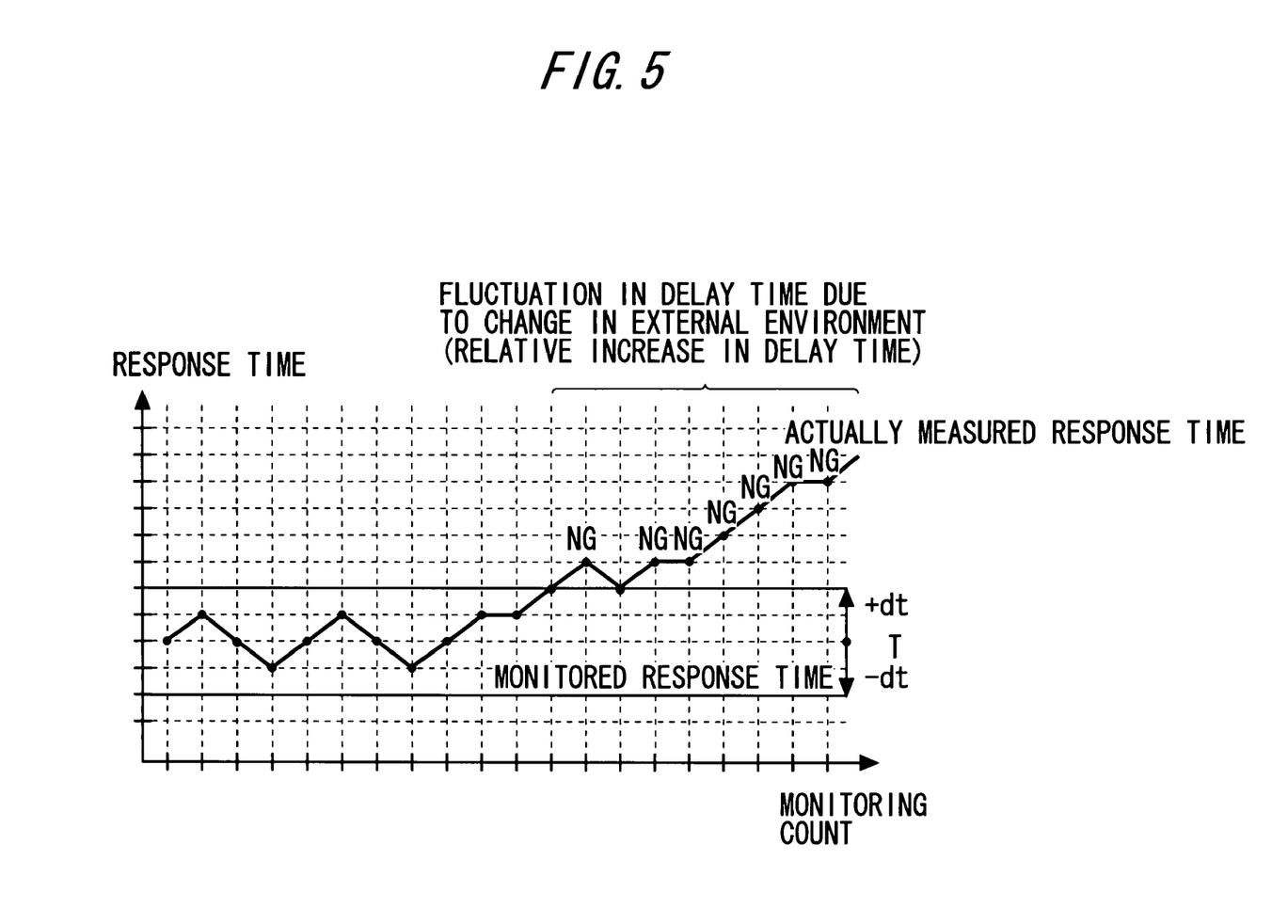
FIG. 5 is a graph showing the relation between the monitoring count and the response time according to prior art.

The response time between the controlling device and the commanded-to-switch-lines device includes a fixed time and a variable time. A fixed time is a physically fixed time that is determined by the wiring length, a bit delay in the device, or the like. A variable time is a time that is varied by fluctuations in a wiring delay between the controlling device and the commanded-to-switch-lines device due to external, environmental factors such as temperature, or by a physical bit delay difference in devices of different types connected to each other. Accordingly, the response time is the sum of a fixed time and a variable time. The controlling device uses a fixed delay time and, as a variable time, an offset value to monitor the response time. The offset value represents a fluctuating time of the response time due to variable factors in the system. The controlling device sets, as a maximum response time value, a value obtained by adding the offset value to an estimated response time and sets, as a minimum response time value, a value obtained by subtracting the offset value from the estimated response time. The controlling device treats the time range between the maximum response time value and the minimum response time value as a range in which a response time is judged as normal. A response time outside of this time range is deemed as a sign of a line trouble. Hereinafter, a line trouble may be referred to as NG. A monitored response time coincides with this range of time. The relation described above is expressed as follows:

A maximum or minimum response time value that is not NG:

$$C(t) = t \pm dt \tag{1}$$

t: a physical transmission time between the controlling device and the commanded-to-switch-lines device (fixed time)

dt: an offset value to account for a fluctuation in transmission time between the controlling device and the commanded-to-switch-lines device FIG. 5 is given as an example of response time monitoring according to Expression (1). FIG. 5 is a graph showing the relation between the monitoring count and the response time according to prior art.

[Patent document 1] JP 2000-116034 A
[Patent document 2] JP 04-86049 A

The controlling device of prior art monitors the response time using t, which represents a fixed time, and dt, which is the value of fluctuation in transmission delay due to external factors, as shown in Expression (1). However, the conventional monitoring method which uses Expression (1) has a problem in that line troubles are detected in succession (NG judgment is made repeatedly) when the external environment changes more than foreseen by the administrator or the like, causing a relative increase or decrease in delay time.

Therefore, to improve the accuracy of measuring the response time, the maximum and minimum response time values, which are expressed by $t \pm dt$, are calculated precisely by making the maximum and minimum response time values conform to the external environment. The allowance of dt, which is a fluctuating value, is reduced by a relative increase or decrease in delay time due to a change in external environment or the like. Accordingly, a relative increase or decrease in delay time due to a change in external environment or the like will result in detection of line troubles (NG judgment) even when the fluctuation is within the initially estimated range. Thus the accuracy of measuring the response time depends on how closely $t \pm dt$ can conform to the external environment.

One of methods that aim to improve the accuracy of measuring the response time is to measure a response time until a time in question or to measure response times at regular cycles. According to this method, the measured times are accumulated in a memory for a certain period of time, and a value obtained by averaging the times accumulated in the memory is set as t. This method minimizes the fluctuating value (dt). Thus the method improves the accuracy of monitoring the response time.

In another method of prior art, measured values of the response time are accumulated as frequency distribution of measured times, and a measured response time value that is the maximum distribution value is set as t. This method minimizes the fluctuating value (dt). Thus the method improves the accuracy of monitoring the response time.

The response time in the conventional methods can be expressed as follows (in these methods, a physical transmission time between the controlling device and the commanded-to-switch-lines device which is a fixed time is used as an actually measured value):

A maximum or minimum response time value that is not NG:

$$C(t) = T1 \pm dt \tag{2}$$

T1: a response time until a time in question or the average value of response times measured at regular cycles and accumulated, or a response time obtained from frequency distribution of measured times dt: an offset value to account for a fluctuation in transmission time between the controlling device and the commanded-to-switch-lines device In these conventional methods, measured values of the response time within a certain time range are accumulated in a memory. The conventional monitoring methods use the response times accumulated in the memory to obtain a maximum or minimum response time value that is not NG. Accordingly, the conventional monitoring methods have a drawback of being incapable of detecting whether a response time is NG or not at an instant.

Figure 6:
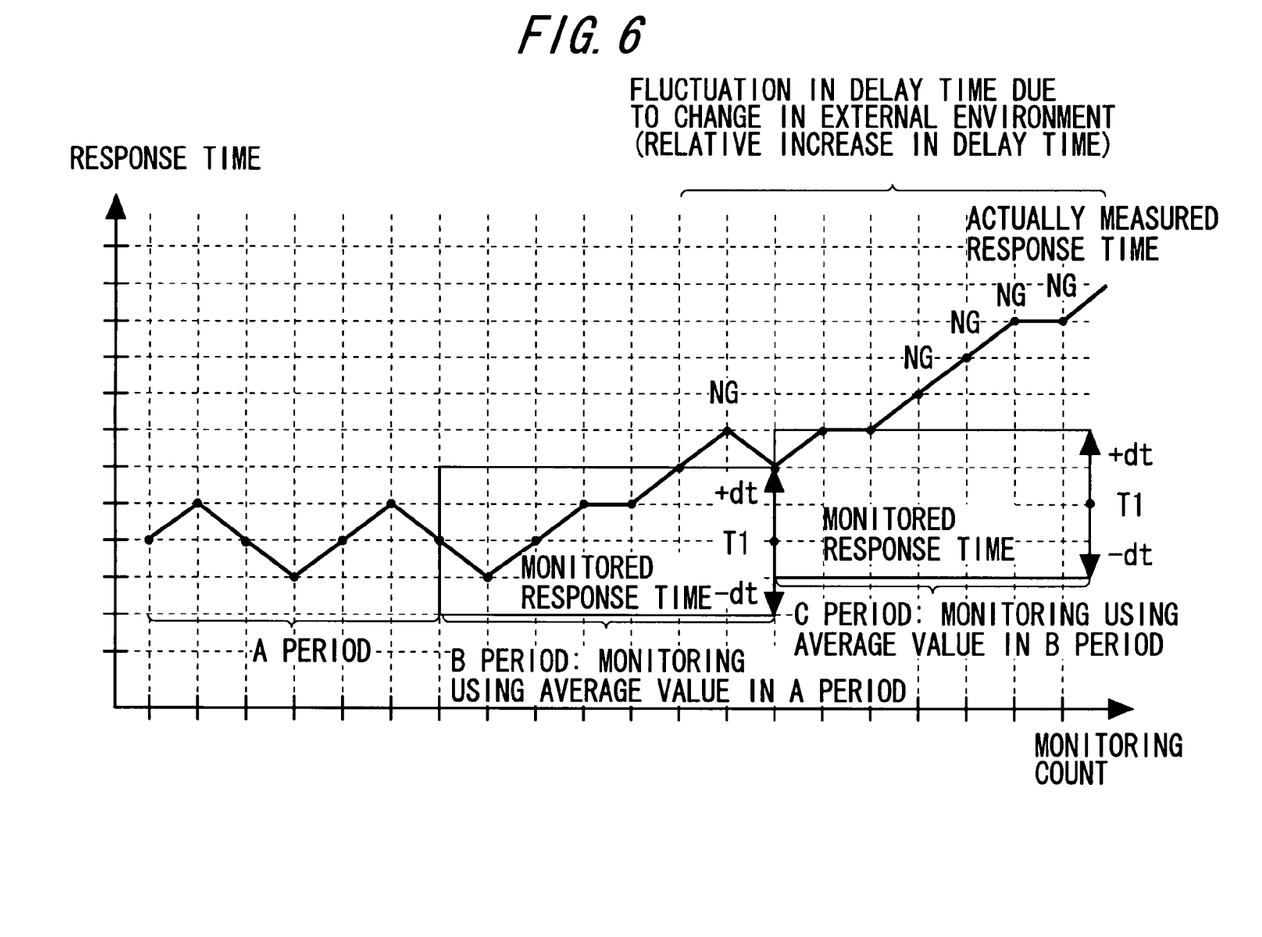
FIG. 6 is a graph showing the relation between the monitoring count and the response time according to prior art.

In addition, the conventional monitoring methods cannot follow a relative delay time fluctuation resulting from constant changes in external environment as shown in FIG. 6, which illustrates an example of the response time monitoring according to Expression (2). FIG. 6 is a graph showing the relation between the monitoring count and the response time according to prior art. The conventional monitoring methods thus have a problem in that the response time cannot be detected accurately.

The present invention has been made in view of the circumstances described above, and an object of the present invention is therefore to provide a monitoring system, a recording medium storing a monitoring program and a monitoring method which achieve more reliable monitoring control by improving the accuracy of measuring a response time to a switching command in line switching, device switching, plant control, information system control, etc.

SUMMARY OF THE INVENTION

In order to achieve the above object, a monitoring system according to the present invention is a monitoring system for monitoring a response time counted from when information is sent until when a response to the information is received, including: calculating unit calculating, with $T(t-1)$ as a response time value measured in the last monitoring, with $T(t-2)$ as a response time value measured in the last but one monitoring, with a as a weight value equal to or larger than 0 and equal to or smaller than 1, and with dt as a given value, weighted average response time added with the limit value $(T(t-1)\times a+T(t-2)\times(1-a)+dt)$ to obtain a maximum response time value that can be judged as normal, and weighted average response time subtracted with the limited value $(T(t-1)\times a+T(t-2)\times(1-a)-dt)$ to obtain a minimum response time value that can be judged as normal; measuring unit measuring the response time; and judging unit judging whether or not the response time measured by the measuring unit satisfies 1) equal to or larger than the minimum response time value calculated by the calculating unit, weighted average response time subtracted with the limited value $(T(t-1)\times a+T(t-2)\times(1-a)-dt$, and 2) equal to or smaller than the maximum response time value calculated by the calculating unit, weighted average response time added with the limit value $(T(t-1)\times a+T(t-2)\times(1-a)+dt)$, both.

Further, in the monitoring system according to the present invention, the calculating unit sets the value a to 0.5 when $T(t-1)$ and $T(t-2)$ are different values.

Further, in the monitoring system according to the present invention, when the measured response time does not satisfy 1) equal to or larger than the minimum response time value calculated by the calculating unit, weighted average response time subtracted with the limited value $(T(t-1)\times a+T(t-2)\times(1-a)-dt$, and 2) equal to or smaller than the maximum response time value calculated by the calculating unit, weighted average response time added with the limit value $(T(t-1)\times a+T(t-2)\times(1-a)+dt)$, both, the calculating unit employs the value of $T(t-1)$ that is used in this monitoring as the value of $T(t-1)$ that is used to calculate the maximum and minimum response time values in the next monitoring, and employs the value of $T(t-2)$ that is used in this monitoring as the value of $T(t-2)$ that is used to calculate the maximum and minimum response time values in the next monitoring.

Further, a recording medium storing a monitoring program according to the present invention causes a computer to function as the following unit, the computer serving to monitor a response time counted from when information is sent until when a response to the information is received, the unit including: calculating unit calculating, with $T(t-1)$ as a response time value measured in the last monitoring, with $T(t-2)$ as a response time value measured in the last but one monitoring, with a as a value equal to or larger than 0 and equal to or smaller than 1, and with dt as a given value, weighted average response time added with the limit value $(T(t-1)\times a+T(t-2)\times(1-a)+dt)$ to obtain a maximum response time value that can be judged as normal, and weighted average response time subtracted with the limited value $(T(t-1)\times a+T(t-2)\times(1-a)-dt)$ to obtain a minimum response time value that can be judged as normal; measuring unit measuring the response time; and judging unit judging whether or not the response time measured by the measuring unit satisfies 1) equal to or larger than the minimum response time value calculated by the calculating unit, weighted average response time subtracted with the limited value $(T(t-1)\times a+T(t-2)\times(1-a)-dt)$, and 2) equal to or smaller than the maximum response time value calculated by the calculating unit, weighted average response time added with the limit value $(T(t-1)\times a+T(t-2)\times(1-a)+dt)$, both.

Further, a monitoring method according to the present invention is a monitoring method for monitoring a response time counted from when information is sent until when a response to the information is received, including: calculating, with $T(t-1)$ as a response time value measured in the last monitoring, with $T(t-2)$ as a response time value measured in the last but one monitoring, with a as a weight value equal to or larger than 0 and equal to or smaller than 1, and with dt as a given value, weighted average response time added with the limit value $(T(t-1)\times a+T(t-2)\times(1-a)+dt)$ to obtain a maximum response time value that can be judged as normal, and weighted average response time subtracted with the limited value $(T(t-1)\times a+T(t-2)\times(1-a)-dt)$ to obtain a minimum response time value that can be judged as normal; measuring the response time; and judging whether or not the response time measured by the measuring step satisfies 1) equal to or larger than the minimum response time value calculated by the calculating step, weighted average response time subtracted with the limited value $(T(t-1)\times a+T(t-2)\times(1-a)-dt)$, and 2) equal to or smaller than the maximum response time value calculated in the calculating step, weighted average response time added with the limit value $(T(t-1)\times a+T(t-2)\times(1-a)+dt)$, both.

DETAILED DESCRIPTION OF THE INVENTION

Figure 1:
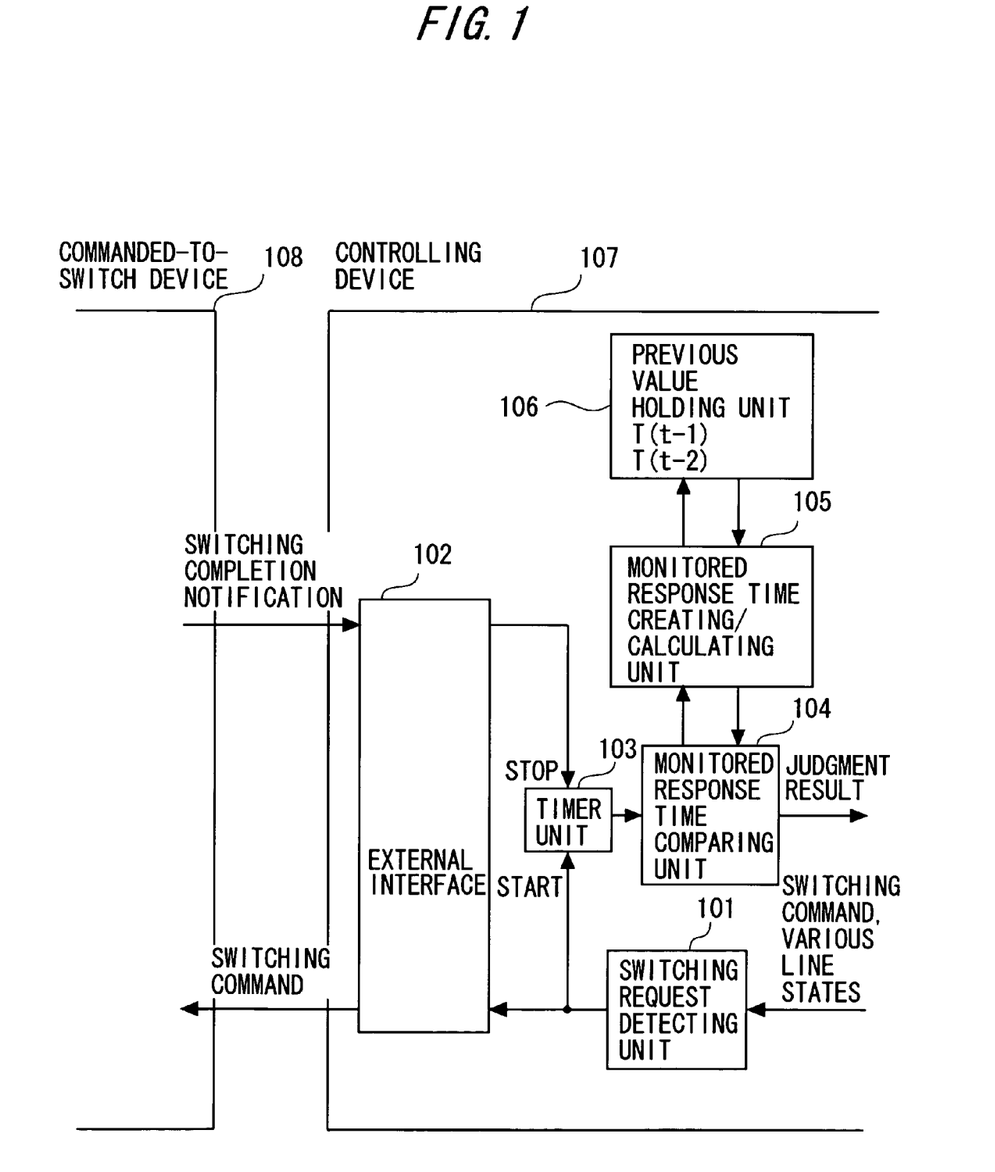
FIG. 1 is a configuration diagram showing the configuration of an embodiment of a monitoring system according to the present invention.

Hereinafter, the best mode of carrying out the present invention will be described with reference to the drawings. The following embodiment is for exemplification only, and the present invention is not limited to the configuration of the embodiment. First, the configuration of an embodiment of a monitoring system according to the present invention is described with reference to FIG. 1. FIG. 1 is a configuration diagram showing the configuration of the embodiment of the monitoring system according to the present invention. The following description of the embodiment of the monitoring system according to the present invention doubles as a description of a monitoring program and monitoring method according to the present invention.

As shown in FIG. 1, in the embodiment of the monitoring system according to the present invention, a controlling device 107 monitors a commanded-to-switch device (controlled device or switching device) 108. In FIG. 1, a switching request detecting unit 101 in the controlling device 107 detects a switching command from an administrator or a switching request issued through various line state judgment notifications. Detecting a switching request, the switching request detecting unit 101 sends a switching command to the commanded-to-switch device 108 via an external interface 102. As the switching request detecting unit 101 detects the switching request, a timer unit 103 starts counting to measure a response time.

After the switching request detecting unit 101 sends the switching command, a monitored response time comparing unit 104 compares a timer value T(t) of a response time measured by the timer unit 103 against a monitored response time C(t) (C(t)={(T(t−1)×a)+(T(t−2)×(1−a))}±dt), which is calculated by a monitored response time creating/calculating unit 105. The expression of the monitored response time C(t) will hereinafter be referred to as Expression (3). In Expression (3), a timer value that is measured in this monitoring is denoted by T(t), a timer value that is measured in the last monitoring is denoted by T(t−1), and a timer value that is measured in the last but one monitoring is denoted by T(t−2), and this applies throughout the following description. The value a is set to 0.5 when T(t−1) and T(t−2) are different from each other. The value a is set to an arbitrary value when T(t−1) and T(t−2) are equal to each other.

The monitored response time comparing unit 104 judges that switching has been completed normally when a timer value T(t) upon reception of a switching completion notification from the commanded-to-switch device 108 is equal to or larger than the minimum value of the monitored response time C(t) and equal to or smaller than the maximum value of the monitored response time C(t).

In the case where switching is completed normally, a previous value holding unit 106 keeps the response time measured in this monitoring and the response time measured in the last monitoring as a value of T(t−1) and a value of T(t−2), respectively. Thereafter, the switching request detecting unit 101 ends the monitoring operation.

On the other hand, in the case where the timer value T(t) exceeds the maximum value of the monitored response time C(t), the monitored response time comparing unit 104 gives an NG judgment. The monitored response time comparing unit 104 gives an NG judgment also in the case where the timer value T(t) is smaller than the minimum value of the monitored response time C(t). Then the switching request detecting unit 101 ends the monitoring operation.

Figure 2:
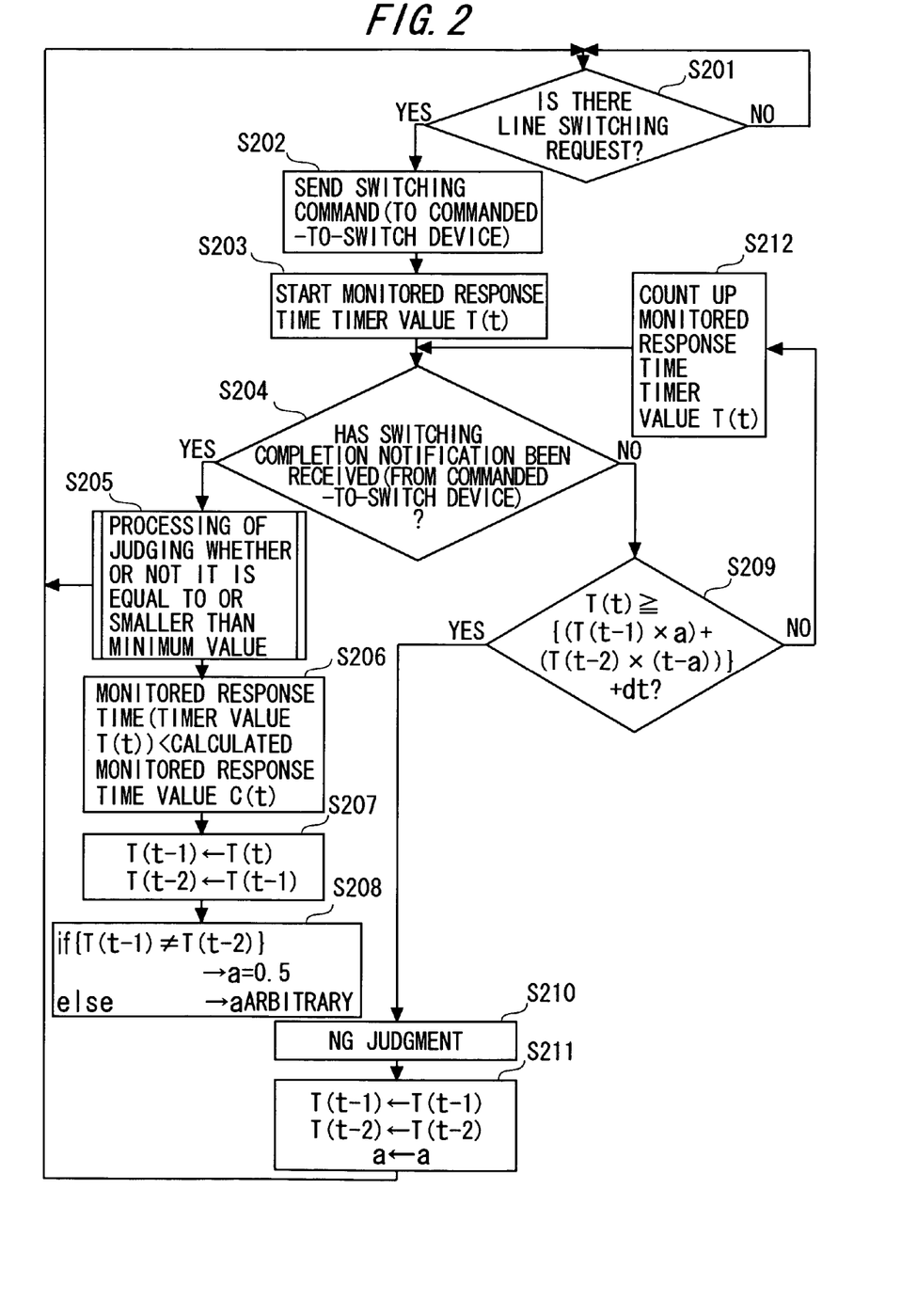
FIG. 2 is a flow chart of the operation of an embodiment of a monitoring system according to the present invention.

Next, a description is given with reference to FIG. 2 on the operation of the embodiment of the monitoring system according to the present invention. FIG. 2 is a flow chart of the operation of the embodiment of the monitoring system according to the present invention. First, the switching request detecting unit detects the presence or absence of a line switching request (Step S201). When a line switching request is detected (YES), the switching request detecting unit sends a switching command to the commanded-to-switch device (Step S202), and counting of the timer value T(t) is started to measure a response time (Step S203). In the case where no line switching request is detected in Step S201 (NO), the switching request detecting unit goes into a stand-by state until a line switching request is detected.

The controlling device next judges whether a switching completion notification has been received from the commanded-to-switch device or not (Step S204). In the case where the switching completion notification has been received (YES), the monitored response time comparing unit performs, in Step S205, processing of judging whether or not the timer value T(t) of the monitored response time is equal to or smaller than the minimum value of the calculated value C(t) of the monitored response time.

Figure 3:
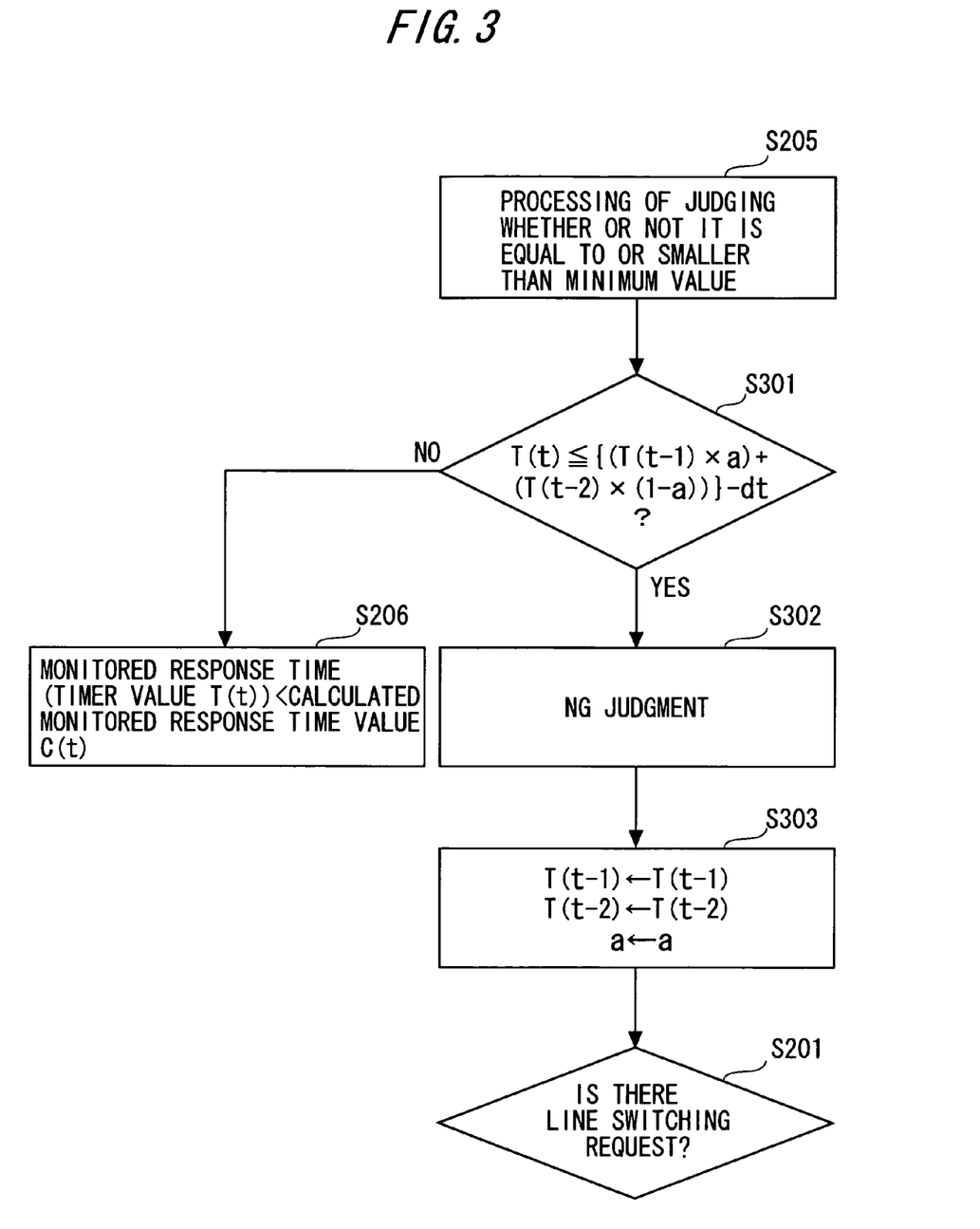
FIG. 3 is a flow chart for processing of judging whether or not a timer value T(t) of a monitored response time is equal to or smaller than a minimum value of a calculated monitored response time C(t) which is shown in Step S205 of FIG. 2.

The judging processing in Step S205 is described with reference to FIG. 3. FIG. 3 is a flow chart for processing of judging whether or not the timer value T(t) of the monitored response time is equal to or smaller than the minimum value of the calculated value C(t) of the monitored response time which is shown in Step S205 of FIG. 2.

In the case where the monitored response time comparing unit judges that the timer value T(t) of the monitored response time is not equal to nor smaller than the minimum value of the calculated value C(t) of the monitored response time (NO), the processing moves on to Step S206. On the other hand, in the case where the monitored response time comparing unit judges that the timer value T(t) of the monitored response time is equal to or smaller than the minimum value of the calculated value C(t) of the monitored response time (YES), the processing moves on to Step S302.

In Step S302, the monitored response time comparing unit gives an NG judgment. The monitored response time comparing unit then keeps the values T(t−1), T(t−2), and a that have been used in calculating C(t) as they are (Step S303). In short, the monitored response time comparing unit employs for calculation of C(t+1) the values T(t−1), T(t−2), and a that have been used in calculating C(t). The processing then moves to Step S201.

In Step S206, the monitored response time comparing unit confirms that the monitored response time T(t) is smaller than the maximum value of the calculated value C(t) of the monitored response time. The monitored response time comparing unit then respectively substitutes T(t−1) and T(t−2) that have been used in calculating C(t) with T(t) and T(t−1), which are actually measured monitoring times. In the case where the values T(t−1) and T(t−2) substituted with T(t) and T(t−1) are different from each other, the monitored response time comparing unit substitutes the value a that is used in calculating C(t) with 0.5. In the case where the values T(t−1) and T(t−2) substituted with T(t) and T(t−1) are equal to each other, the monitored response time comparing unit sets the value a to an arbitrary value. Thereafter, the processing moves to Step S201.

In the case where it is judged in Step S204 that a switching completion notification has not been received (NO), the monitored response time comparing unit judges whether or not the timer value T(t) of the monitored response time is equal to or larger than the maximum value of the calculated value C(t) of the monitored response time (Step S209).

If the monitored response time comparing unit judges that the timer value T(t) of the monitored response time is not equal to nor larger than the maximum value of the calculated value C(t) of the monitored response time (NO), the processing moves on to Step S212. In Step S212, the timer unit counts up the monitored response time timer value T(t), and the processing moves to Step S204.

If it is judged in Step S209 that the timer value T(t) of the monitored response time is equal to or larger than the maximum value of the calculated value C(t) of the monitored response time (YES), the monitored response time comparing unit givens an NG judgment in Step S210. Thereafter, the holding unit keeps the values T(t−1), T(t−2), and a that have been used in calculating C(t) as they are (Step S211). In short, the monitored response time creating/calculating unit employs for calculation of C(t+1), which is used in the next monitoring, the values T(t−1), T(t−2), and a that have been used this time. The processing then moves to Step S201.

Figure 4:
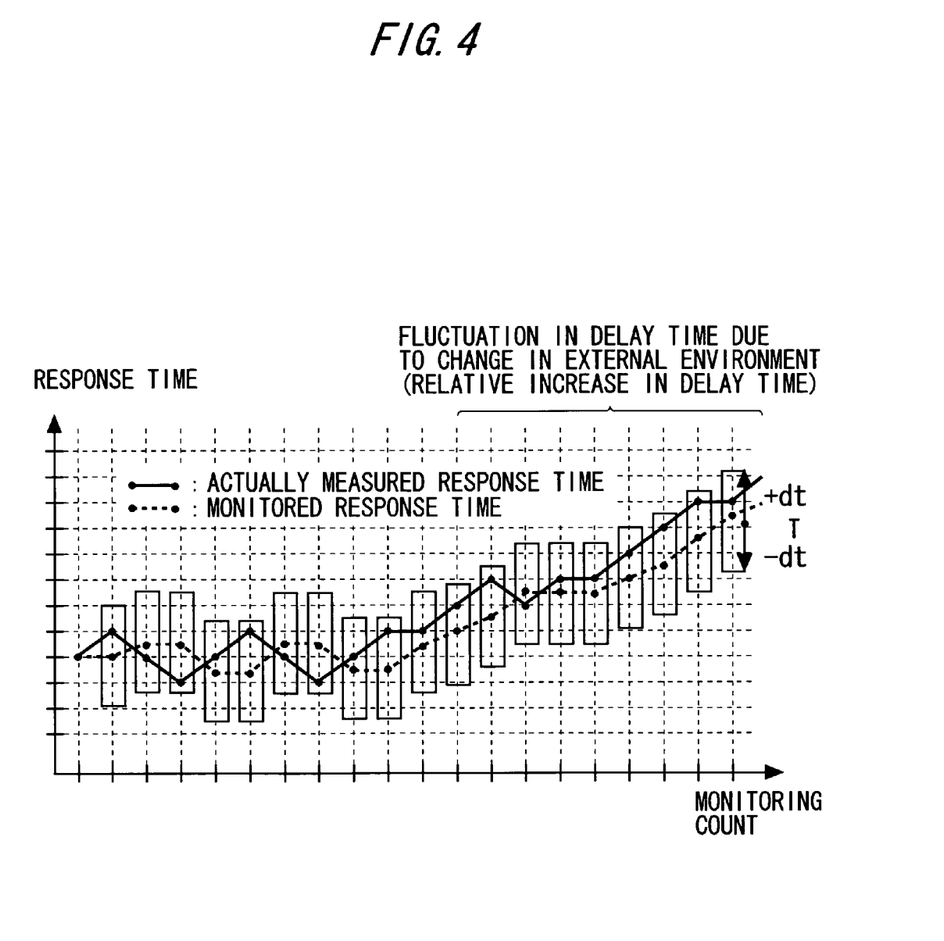
FIG. 4 is a graph showing the relation between the monitoring count and the response time for when a response time is monitored with the use of Expression (3) in an embodiment of a monitoring system according to the present invention.

Now, an example of monitoring a response time according to Expression (3) is described with reference to FIG. 4. FIG. 4 is a graph showing the relation between the monitoring count and the response time for when a response time is monitored with the use of Expression (3) in the embodiment of the monitoring system according to the present invention.

In this embodiment, the coefficient a in Expression (3) is calculated from measured response time values of the last and last but one measurements. The calculated coefficient a is reflected on the monitored response time at a time in question. This embodiment can therefore keep up with constantly changing actual response times and is excellent in its quick readiness. Thus a response time can be monitored with high precision in this embodiment.

In the existing methods, response times are accumulated for a certain time (period) and the average value of monitored response times is calculated from the accumulated information. The existing methods use the average value to determine a monitored response time at a time in question. This causes a problem of the existing methods in that the provability of erroneous detection is raised by a fluctuation that exceeds a certain fluctuation value of a response time. In contrast, a monitored response time in this embodiment is calculated in a manner that follows the actual response time. The probability of erroneous detection is therefore low in this embodiment. This embodiment thus can improve the monitoring accuracy.

This method can make a monitored response time follow response times measured in the last and last but one measurements. Therefore, dt, which is set in advance, can be set to a minimum value. Here, dt represents an offset value to account for a fluctuation in transmission time between the controlling device and commanded-to-switch lines device due to external factors. This embodiment is thus capable of avoiding the erroneous detection resulting from setting too large a fluctuating value which expands the difference.

Unlike the existing methods, this embodiment does not need to accumulate response times for a certain time. Therefore, a storage medium such as a memory or a register is not necessary in this embodiment. This embodiment can thus have a simplified configuration.

Modification Example

Now, a description is given on a modification example of the embodiment of the monitoring system according to the present invention which has been described above. In the embodiment described above, the monitored response time creating/calculating unit substitutes the value a that is used in calculating C(t) with 0.5 in the case where T(t−1) and T(t−2) that are used in calculating C(t) are different from each other. The monitored response time creating/calculating unit sets the value a to an arbitrary value in the case where T(t−1) and T(t−2) that are used in calculating C(t) are equal to each other.

In the modification example, a person who sets the system can set the value a at his/her discretion, as long as it is within a range between and including 0 and 1, in the case where T(t−1) and T(t−2) that are used in calculating C(t) are different from each other.

In this modification example, for instance, C(t) follows the actually measured response time of the last time more closely by setting the value a close to 1 as is clear from Expression (3). For instance, C(t) is prevented from following the actually measured response time of the last time closely by setting the value a close to 0 as is clear from Expression (3).

The description given above deals with a case where an embodiment of the present invention is applied to a communication system. However, the monitoring system of the present invention is not limited to an application to a communication system, and is applicable to any other systems for, for example, monitoring a plant for an anomaly and detecting an anomaly inside an electronic circuit.

The present invention calculates a maximum value and a minimum value between which a response time is judged as normal from a response time value of the last measurement and from a response time value of the last but one measurement. Therefore, the present invention can make a range in which a response time is judged as normal agree with past response times. The present invention can thus achieve highly reliable switching monitoring control.

In the present invention, the value a is set to 0.5 when T(t−1) and T(t−2) are different values. The value a is a coefficient for calculating a maximum value and a minimum value between which a response time is judged as normal. The present invention can therefore determine a range in which a response time is judged as normal while giving the last response time and the last but one response time equal considerations.

In the case where a measured response time is outside of a time range in which a response time is judged as normal, the present invention does not use this response time to calculate a time range in which a response time is judged as normal in the next monitoring. The present invention can therefore calculate a range in which a response time is judged as normal with more precision.

In the present invention, the value a can be set arbitrarily within a range between and including 0 and 1. The value a is a coefficient of T(t−1). Therefore, by setting the value a close to 1, a user can perform such monitoring that follows changes in monitored response time more closely and quickly deals with a change in monitored response time. On the other hand, by setting the value a close to 0, a user can perform such monitoring that follows changes in monitored response time not so closely and deals with a change in monitored response time at a leisured pace.

The disclosures of Japanese patent application No. JP2005-94928 filed on Mar. 29, 2005 including the specification, drawings and abstract are incorporated herein by reference.

What is claimed is:

1. A monitoring system including a controlling device for monitoring a response time between sending information and receiving a response to the information, the controlling device comprising:

a memory storing executable instructions;

a processor executing the executable instructions causing the processor to operate as:

a previous value holding unit to hold a response time value T(t−1) measured in last monitoring and a response time value T(t−2) measured in last but one monitoring;

a calculating unit to calculate a maximum value of an normal range to be applied to a response time value T(t) measured in this monitoring by calculation of an expression 1 employing the response time value T(t−1), the response time value T(t−2), a weight value a (0<a<1) and an offset value dt, and to calculate a minimum value of the normal range to be applied to the response time value T(t) measured in this monitoring by calculation of an expression 2 employing the response time value T(t−1), the response time value T(t−2), the weight value a and the offset value dt, wherein the expressions 1 and 2 are as follows, $(T(t-1) \times a + T(t-2) \times (1-a)) + dt$, and    expression 1

$(T(t-1) \times a + T(t-2) \times (1-a)) - dt$;    expression 2 a measuring unit to measure the response time value T(t) in this monitoring; and a judgment unit to judge whether or not the response time value T(t) is in the normal range between the calculated maximum value and the calculated minimum value, wherein the calculating unit, in case where the response time value T(t) is in the normal range, updates the response time value T(t−2) held in the previous value holding unit with the response time value T(t−1) and updates the response time value T(t−1) held in the previous value holding unit with the response time value T(t) to calculate a maximum value and a minimum value of a new normal range to be applied to a next response time value T(t+1) in a next monitoring by calculation of the expressions 1 and 2 employing the updated response time values T(t−2) and T(t−1) held in the previous value holding unit, the weight value a, and the offset value dt, and wherein the judging unit, in case where the response time value T(t) is out of the normal range, performs judging whether or not the response time value T(t+1) in the next monitoring is in the normal range of the response time value T(t) without update of the response values T(t−2) and T(t−1) held in the previous value holding unit.

2. The monitoring system according to claim 1, wherein the calculating unit sets the weight value a to 0.5 when the response time value T(t−1) and the response time value T(t−2) in the previous value holding unit are different values.

3. The monitoring system according to claim 1, wherein the weight value a can be set arbitrarily within a range between and including 0 and 1.

4. A monitoring method implemented using a processor for monitoring a response time between sending information and receiving a response to the information, comprising:

holding a response time value T(t−1) measured in last monitoring and a response time value T(t−2) measured in last but one monitoring;

calculating, using the processor, a maximum value of a normal range to be applied to a response time value T(t) measured in this monitoring by calculation of an expression 1 employing the response time value T(t−1), the response time value T(t−2), a weight value a (0<a<1) and an offset value dt, and to calculate a minimum value of the normal range to be applied to the response time value T(t) measured in this monitoring by calculation of an expression 2 employing the response time value T(t−1), the response time value T(t−2), the weight value a and the offset value dt, wherein the expressions 1 and 2 are as follows, $(T(t-1) \times a + T(t-2) \times (1-a)) + dt$, and    expression 1

$(T(t-1) \times a + T(t-2) \times (1-a)) - dt$;    expression 2 measuring the response time value T(t) in this monitoring; and judging whether or not the response time value T(t) is in the normal range between the calculated maximum value and the calculated minimum value, wherein the calculating, in case where the response time value T(t) is in the normal range, updates the response time value T(t−2) held by the holding with the response time value T(t−1) and updates the response time value T(t−1) held by the holding with the response time value T(t) to calculate a maximum value and a minimum value of a new normal range to be applied to a next response time value T(t+1) in a next monitoring by calculation of the expressions 1 and 2 employing the updated response time values T(t−2) and T(t−1), the weight value a, and the offset value dt, and wherein the judging, in case where the response time value T(t) is out of the normal range, performs judging whether or not the response time value T(t+1) in the next monitoring is in the normal range of the response time value T(t) without update of the response values T(t−2) and T(t−1) held by the holding.

5. The monitoring method according to claim 4, wherein the calculating includes setting the weight value a to 0.5 when the response time value T(t−1) and the response time value T(t−2) in the previous value holding unit are different values.

6. The monitoring method according to claim 4, wherein the calculating includes using the value a set arbitrarily within a range between and including 0 and 1.

* * * * *